United States Patent [19]
Moll et al.

[11] Patent Number: 5,355,313
[45] Date of Patent: Oct. 11, 1994

[54] NEURAL NETWORK INTERPRETATION OF AEROMAGNETIC DATA

[75] Inventors: Robert F. Moll, Englewood; William C. Pearson, Lakewood; John R. Rogers, Castle Rock; Jacky M. Wiener, Englewood, all of Colo.

[73] Assignee: Texaco Inc., White Plains, N.Y.

[21] Appl. No.: 783,016

[22] Filed: Oct. 25, 1991

[51] Int. Cl.$^5$ .............................................. G01V 1/00
[52] U.S. Cl. .................................................. 364/420
[58] Field of Search ...................... 364/420, 421, 422; 395/23, 929

[56] References Cited

U.S. PATENT DOCUMENTS

| | | | |
|---|---|---|---|
| 4,628,266 | 12/1986 | Dzwinel | 324/330 |
| 4,633,182 | 12/1986 | Dzwinel | 324/335 |
| 4,646,240 | 2/1987 | Serra et al. | 395/929 |
| 4,713,775 | 12/1987 | Scott et al. | 395/929 |
| 4,939,648 | 7/1990 | O'Neill et al. | 395/929 |
| 5,181,171 | 1/1993 | McCormack et al. | 395/929 |

OTHER PUBLICATIONS

Bitto, Joseph; "Seismic event discrimination using neural networks"; (Thesis); Dec. 1989; vii–74.
Expert systems technology; Chap. 3 Prospector; Hart, P. et al.; pp. 42–61.
Al-Kaabi et al.; "Using Artificial Neural Networks to identify the well test interpretation model"; SPE; pp. 77–88.

*Primary Examiner*—Roy N. Envall, Jr.
*Assistant Examiner*—Xuong M. Chung-Trans
*Attorney, Agent, or Firm*—James L. Bailey; Kenneth R. Priem; Russell J. Egan

[57] ABSTRACT

A method for determining depth to basement from aeromagnetic data utilizes neural networks to automate the laborious process of profile interpretation. The neural networks provide consistency, accuracy and overall quality without bias of interpretation.

21 Claims, 4 Drawing Sheets

NEURAL NETWORK INTERPRETATION OF AEROMAGNETIC DATA

BACKGROUND OF THE INVENTION

1. The Field of the Invention

The present invention relates to a method for locating magnetic structural bodies within the earth and in particular to a method using neural networks for determining the subsurface location, geometry and depth to basement of these bodies from aeromagnetic data.

The magnetic method plays an important role in mineral, petroleum, and geothermal exploration. It also has made important contributions to geologic mapping, structural geology, and platetectonic theory. In particular, magnetic measurements using aircraft (aeromagnetics) provide a relatively inexpensive way to trace magnetic rock units beneath covered areas, to reveal the shape of subsurface magnetic bodies, and to interpolate subsurface geologic information between widely spaced seismic data and other localized geophysical measurements.

Aeromagnetics are used by the petroleum industry to map magnetic features within the crystalline basement of the earth's crust such as geologic faults, magnetic bodies associated with mineral deposits, and basement structures associated with oil & gas accumulations. The aeromagnetics actually measure the magnetite content within the crystalline basement and from there interpretations are made about the geologic structure of the area. Aeromagnetics are relatively inexpensive data to collect and are used in the initial phases of petroleum exploration when no other or little data exists.

Interpretation of aeromagnetic data generally consists of modelling of the magnetic field data, either forward or inverse modelling, filtering and enhancement techniques of the mapped contour data, and profile analysis. The modelling procedure involves taking the individual aeromagnetic profile data and fitting a given geologic model (i.e. geologic cross-section) magnetic response to the actual collected profile data until the cross-section magnetic response matches the actual data. The filtering procedure involves computer filtering of the contour data (i.e. second vertical derivative, horizontal gradient, bandpass filtering, continuation filtering, inversion filtering, etc.) in order to interpret the underlying geologic bodies causing the measured magnetic response. This step is generally very subjective and does not always result in accurate interpretation of the underlying geology. Another interpretation technique is to manually analyze the individual magnetic flightline profiles for basement structure. This step is extremely labor intensive and most of the time is not done at all because it requires an experienced geophysicist to do. However, of all the procedures, profile interpretation is the most important. As one can see, these procedures are very laborious, convoluted, and time consuming and as a result, most of these interpretational procedures are never done or are done on a limited basis. Therefore if a procedure could be developed which could accurately identify basement structure and automate this laborious process, it would be very valuable to the petroleum industry. This is the basis of our current invention, to accurately identify basement structures and automate the time consuming processing by neural networks.

Several excellent reviews of the current state of aeromagnetic interpretation techniques have been published by, for example: Reford, M. S., 1980, Magnetic Method: Geophysics, vol. 45, pp. 1640-58; Paterson, N. R., and Reeves, C. V., 1985, Applications of Gravity and Magnetic Surveys: The State-of-the-Art in 1985: Geophysics, vol. 50, pp. 2558-94; and Hinze, W. J., ed., 1985, The Utility of Regional Gravity and Magnetic Anomaly Maps, Tulsa, Okla., Society of Exploration Geophysicists, 454 pgs.

2. The Prior Art

Determination of the location and the depth to basement faults and structures in the earth is one of the most important reconnaissance exploration tools in the petroleum exploration industry. This is because many hydrocarbon reservoirs are associated with uplifted basement fault blocks and accurate mapping of subsurface structures greatly improves exploration well success rates and lowers the cost of finding hydrocarbons in sedimentary basins.

Subsurface geologic structure is commonly deduced from the mapping of surface structures and features, well log correlations, and by seismic reflection and refraction profiling. However, surface features do not always reflect deep structure when masked by surficial alluvium and moderately lithified shallow sediments. Also, the high cost of drilling deep exploratory well holes and collecting reflection seismic data often preclude their economic usefulness in delineating deep structures. Thus surveys which measure the magnetic field at or above the earth's surface, particularly from an airplane (aeromagnetics), can be an economic, environmentally attractive alternative to these other methods in unexplored or underexplored sedimentary basins.

Currently, aeromagnetic data are interpreted using combinations of simple computational and empirical techniques. The following Table I lists several of the manual and computer techniques currently used to predict location and depth of magnetic basement structural features.

TABLE I

List of Techniques

1. Qualitative correlation of observed magnetic data over known oil fields to aeromagnetic survey lines.
2. Qualitative correlation of modeled magnetic anomalies over target structures with aeromagnetic survey lines.
3. Empirical depth determination using graphical techniques, such as the Peter's half slope method.
4. Computer depth and location solutions for corners of magnetic bodies (Werner Deconvolution).
5. Computer direct modeling and fitting using interactive graphics workstations.
6. Computer inverse modeling (both 2D and 3D modeling).
7. Qualitative correlation of filtered aeromagnetic maps (second vertical derivative) to known oil fields.

However, these techniques are limited in their usefulness and accuracy largely due to the difficulty in differentiating between magnetic anomalies related to compositional contrasts and anomalies related to structural relief. Furthermore, the manual techniques are largely qualitative and yield approximate lateral locations and can not accurately determine depth or vertical relief of the deep structures. Because of these problems in magnetic interpretation and analysis, aeromagnetic data has been of limited use in the petroleum exploration industry today.

SUMMARY OF THE INVENTION

Deep basement structures can be accurately located and their shapes mapped from aeromagnetic data using neural network technology. Neural networks are pattern recognition tools that make use of parallel connections of simple non-linear functions. The simplifying assumptions and limitations required by current interpretational art is no longer necessary because the neural network learns the relationship between observed magnetic fields and deep basement structures. Additionally, once the network learns this relationship, it can accurately determine structure throughout the geologic province.

The invention concerns a method of accurately determining the depth, geometry, and location of basement structures from aeromagnetic data using neural networks. It comprises forward modeling of a given basement response on a computer and inputting this computed response into a specially designed backpropagation neural network for the training phase of the invention. What this means is that the neural network "learns" the appropriate magnetic response to a given basement configuration. Once trained, the neural network is then applied to the remaining aeromagnetic data in the area to produce the basement structure for interpretation.

BRIEF DESCRIPTION OF THE DRAWINGS

The present invention will now be described, by way of example, with reference to the accompanying drawings, in which.

DETAILED DESCRIPTION OF THE PRESENT INVENTION

Heretofore the known method for aeromagnetic processing and interpretation for basement structures has involved a number of qualitative and quantitative procedures which are highly correlated and not particularly accurate. These procedures would typically involve some forward modeling on a computer to calculate the magnetic response of a desired basement structure. This response would then be qualitatively correlated to the aeromagnetic data to see if a similar response exists on the observed data. This procedure would be accompanied by some inverse modeling to determine if an interpreted magnetic anomaly could be caused by a basement structure. These procedures would be iterated until a decision is reached, in concert with the above, and the mapped aeromagnetic data would be run through a series of mathematical filters (i.e. 2nd vertical derivative, horizontal derivative, high pass, structural inversion, etc.). Also, to accentuate structural relief, the map procedures would then be correlated to the profile procedures and the best guess would be made as to the basement configuration. Clearly, this is a time-consuming, laborious process and only yields a qualitative approximation, at best. As a result, aeromagnetic data has been considered to be of limited value to the petroleum exploration industry.

Figure 1:
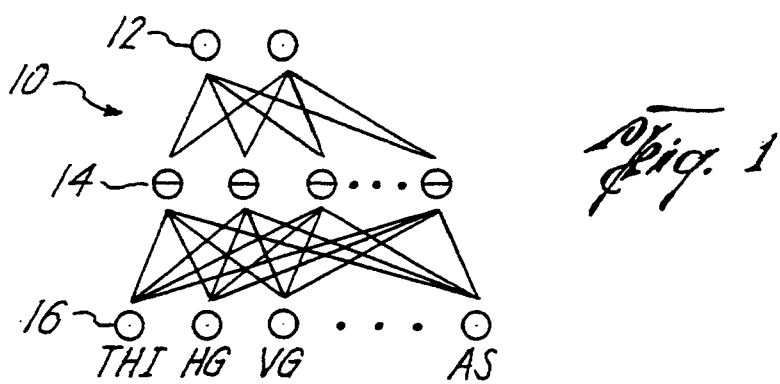
FIG. 1 is a schematic of the general architecture of a neural network.
Figure 2:
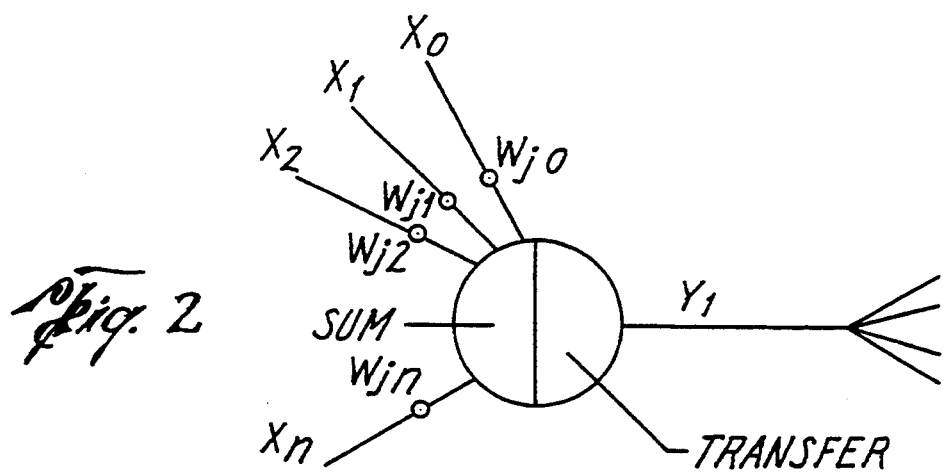
FIG. 2 is a schematic of a neural processing element.

A different approach is employed in accordance with the present invention. For the present invention, highly accurate and more rapid reduction of aeromagnetic data for delineating basement structure is achieved through the use of neural networks. The neural network 10 (FIG. 1) is designed with three layers, an input layer 12 which contains the aeromagnetic data, an intermediate or hidden layer 14, and an output layer 16 which contains the information to be learned. All of the layers are fully connected to one another. The network preferably contains nine input elements, five hidden elements, and nine output elements to distinguish between compositional bodies and structural bodies on the aeromagnetic data. It should be here noted that one skilled in the art may come up with many variations on the network design in order to achieve comparable results without departing from the spirit or essential characteristics of the present invention. For this example of the invention, the input variables included total field intensity, lagged total field intensity and various transforms from both real and synthetically generated data. What this means is that the total magnetic intensity samples were shifted up and down around a magnetic sample creating a window of data around a central point so that the neural network could "sense" both the amplitude of the anomaly as well as the frequency.

The computer generated or synthetic magnetic profile responses were used to "train" the neural network to recognize a variety of possible structural features anticipated to be found in the real data. During training, the neural network was given the synthetic data, asked to analyze it and predict the structure. This predicted structure was then compared with the structure used to generate the synthetic data, also lagged in the same manner as the total magnetic intensities, and the connection weights were adjusted to minimize the difference between the predicted and actual model.

In backpropagation, the responsibility for reducing output error is shared among all of the connection weights. In this invention, the well known Delta Rule is used for weight adjustment during learning. The global error function to be minimized is defined as $$E = 0.5 * \Sigma_k (D_k - O_k)^2$$

where the subscript k refers to the kth output node, $D_k$ is the desired output, and $O_k$ the actual output from the kth output node.

The global error is then redistributed throughout the network according to $$E_j^{(s)} = F(I_j^{(s)}) * \Sigma_k (E_k^{(s+1)} * W_{kj}^{(s+1)})$$

where $E_j^{(s)}$ is the error assigned to the jth node in the sth layer. The connection weights are then adjusted according to $$\Delta W_{ji} = \text{lcoef} * E_j^{(s)} * X_i^{(s-1)}$$

where $0 < \text{lcoef} < 1$ is the learning coefficient.

It is the connection weight values at the end of training that determine the quality of the network for basement relief mapping.

This was done until the difference between the predicted and actual structure reached an acceptable tolerance, usually around 8,000 passes of the data. Once training of the neural network was completed, the network was then rigorously tested against known structural anomalies on aeromagnetic data, as well as other training data, to insure the accuracy of the results.

Figure 7:
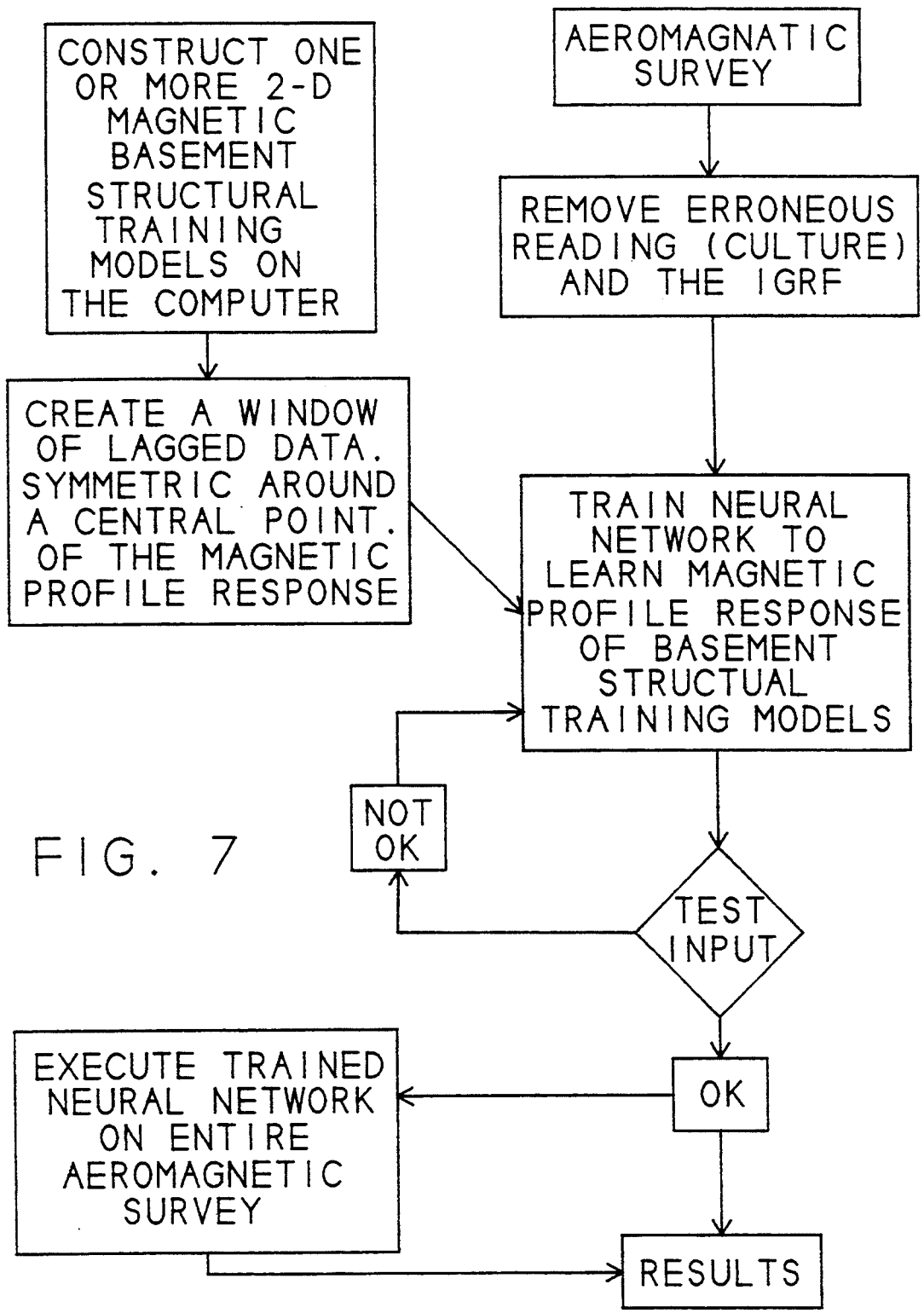
FIG. 7 is a flow diagram showing the steps of the present invention.

The procedure for deriving subsurface structure of the magnetic basement from recorded aeromagnetic profile data requires six steps, as shown in FIG. 7.

1. The 2-dimensional magnetic profile response is calculated for one or more basement structural features constructed with geometrical dimensions characteristic of the basin under study. These computer generated, synthetic responses or profiles are then saved and used to train the neural network preparatory to analysis of the real aeromagnetic data. The synthetic data is generated at the same spacing as will be used in the recording of the aeromagnetic data over the area of interest.

2. The aeromagnetic profile response is recorded over the study area of interest and processed according to standard art to remove erroneous readings and the International Geomagnetic Reference Field.

3. A window of data including the samples on either side of a central data point is used for input into the neural network. The number of data samples in the window equals the number of input nodes in the neural network. This window is shifted along the profile by one sample point and the analysis is repeated and this procedure is followed from one end of the profile to the other. This procedure is followed for both the synthetic profiles and the field recorded profiles.

4. The synthetic profiles are used to "train" the neural network to recognize magnetic anomalies caused by various subsurface structural types likely to be encountered in the study area. During the training process, the neural network is repeatedly given the synthetic data from Step 1 and asked to predict the structure. Node weights are adjusted as described above and learning takes place. The training may be repeated up to 8,000 iterations before acceptable levels of performance are achieved.

5. The trained network is then tested on aeromagnetic data somewhere in the basin where structure is already accurately known from drilling and/or seismic profiling. If performance is acceptable, the network can be applied to aeromagnetic data from the study area in the same basin, Step 6. If performance is unacceptable, Steps 1, 3, and 4 must be repeated until acceptable performance is achieved.

6. Finally, the network is applied to the processed aeromagnetic data from Step 2 and a map or subsurface structure is made from the results.

This six step procedure of network training using computer generated synthetic data from models characterizing the basin and network application to the analysis of field recorded aeromagnetic data from the same basin is demonstrably quicker and more accurate than is possible with the heretofore known practices.

Figure 3:
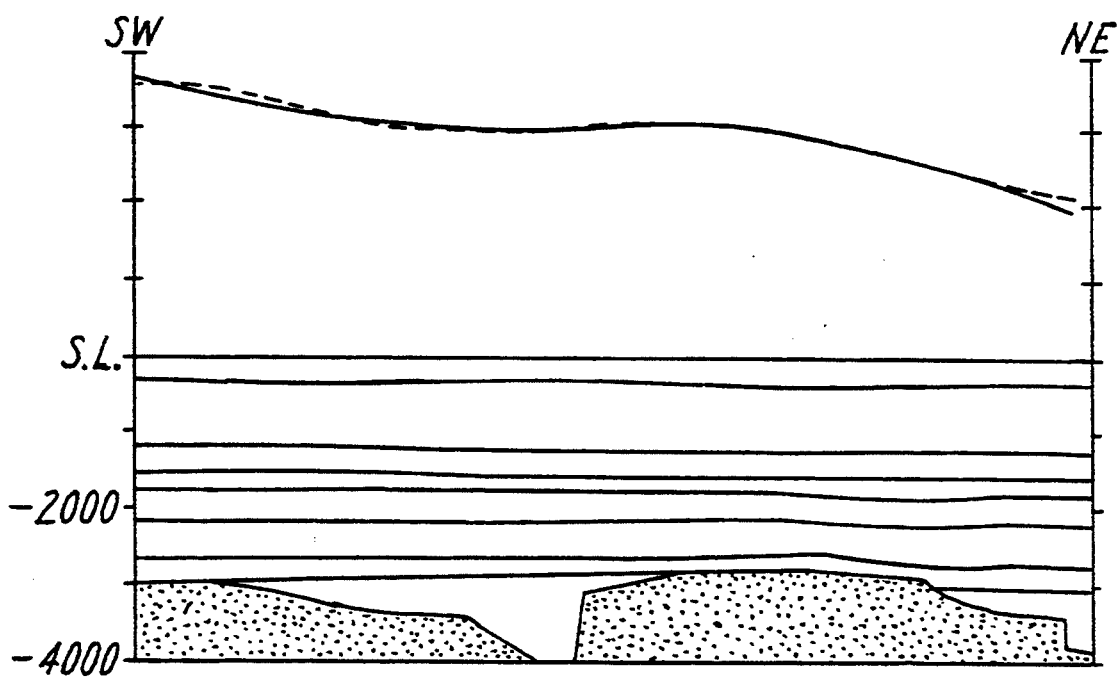
FIG. 3 is a typical magnetic inverse model over a known oilfield.
Figure 4:
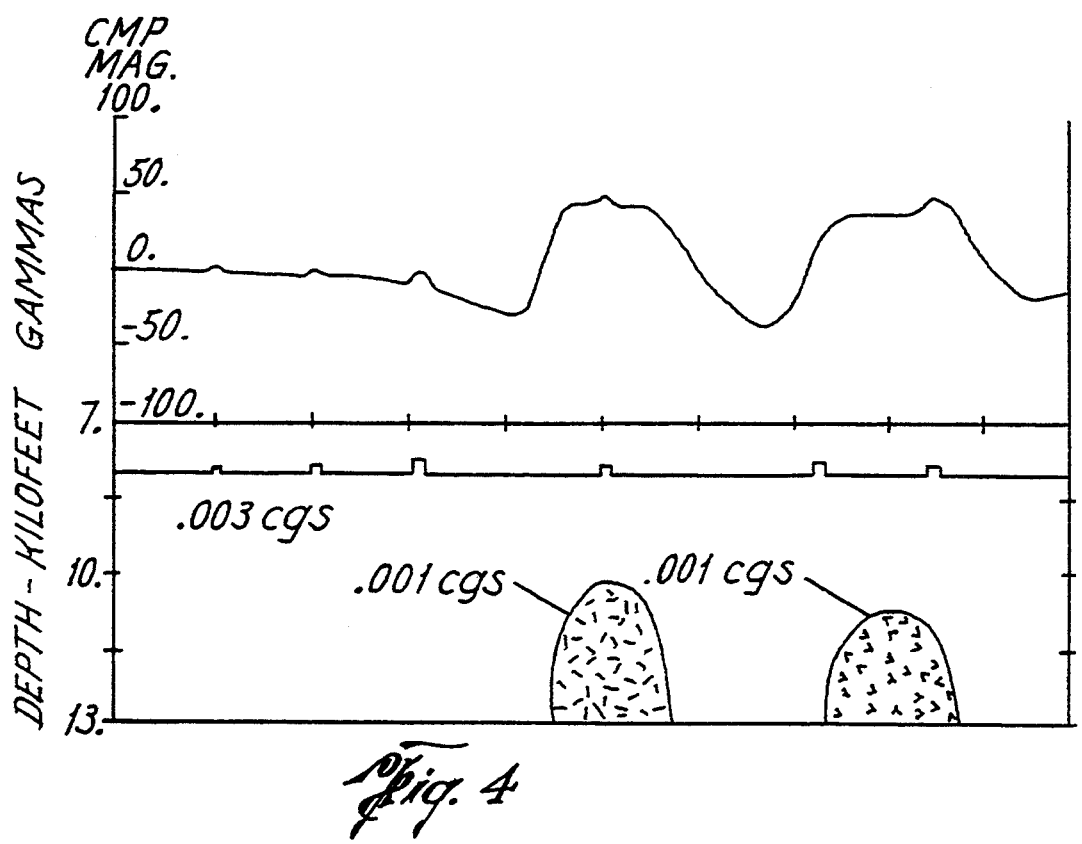
FIG. 4 is a theoretical structural model used to train the neural network.
Figure 5:
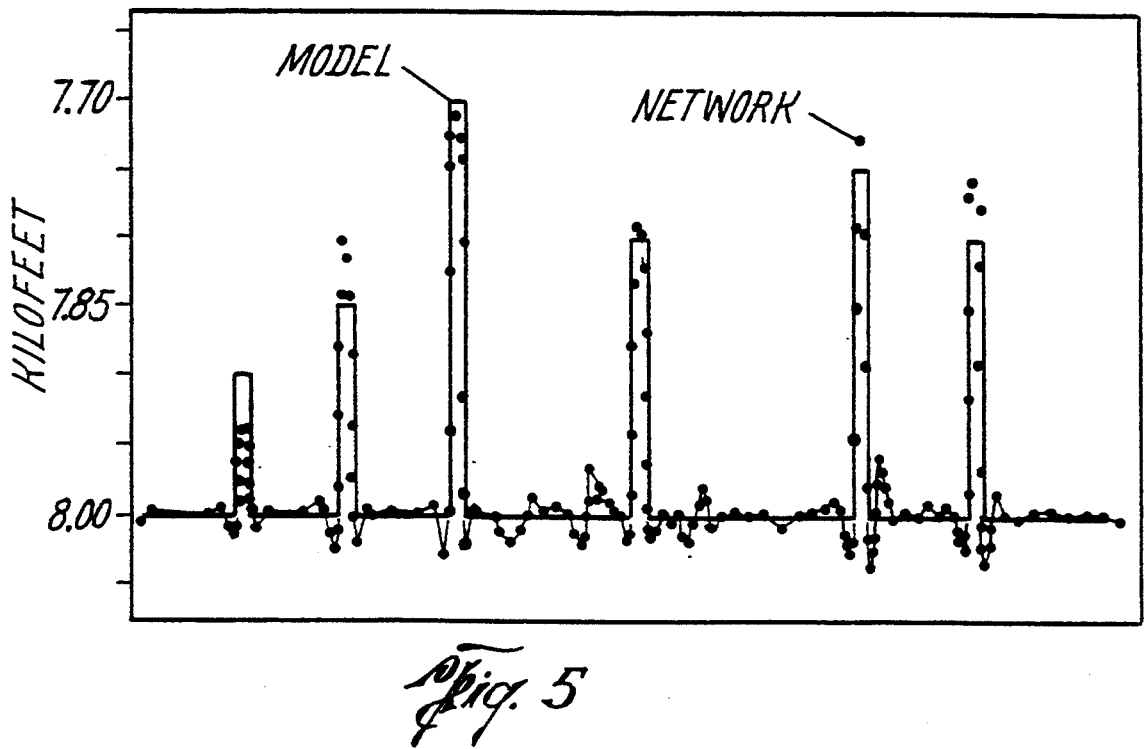
FIG. 5 is the result of applying the neural network to the training model.
Figure 6:
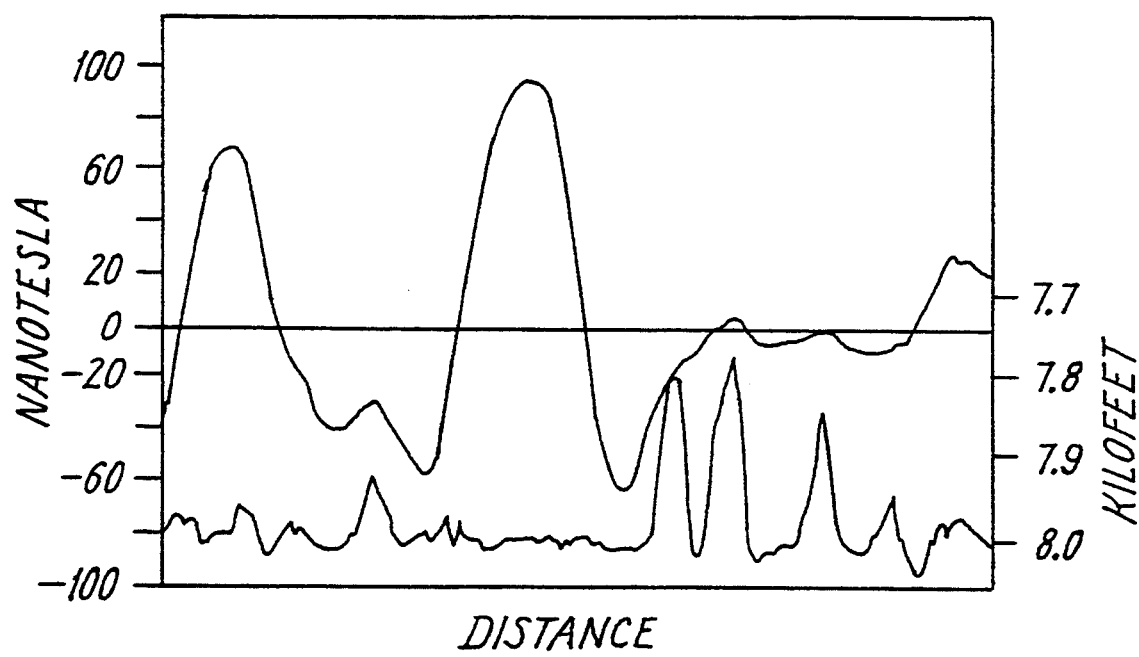
FIG. 6 shows the results of applying to the network to a given magnetic profile producing the basement relief.

FIG. 3 is a typical magnetic profile model across a known oil field. FIG. 4 is a theoretical structure model including six small basement structures and two intrabasement compositional bodies and used to train the subject neural network. FIG. 5 is the result of applying the network to the training model. FIG. 6 is the result of applying the network to an actual aeromagnetic profile across the test field producing basement relief.

The neural network system has proven to be a fast, accurate, and objective method for recognition of magnetic structural anomalies even in the presence of noise and intrabasement signal.

The present embodiment is intended in all respects to be illustrative and not restrictive as to the scope of the present invention as defined by the appended claims.

We claim:

1. A computer implemented method for studying structural anomalies along aeromagnetic traces comprising the steps of:

providing a neural network having at least input, intermediate and output layers;

forming at least one two-dimensional profile magnetic basement structural model, each said at least one model having a range of geometric dimension approximating an area to be studied;

reprocessing aeromagnetic survey profiles to remove erroneous readings and the International Geomagnetic Reference Field;

windowing said profiles for input into the network;

training the neural network through weight adjustment using computer generated magnetic profiles from basement structures representative of those anticipated to be found in the basin of interest;

testing the trained network on aeromagnetic profiles where basement structures are already known from other means to validate the network; and applying the network to recorded aeromagnetic profiles over an unknown portion of the basin.

2. The computer implemented method according to claim 1 further comprising the step of adjusting node weights during the learning process to minimize the error between network prediction and known models according to the Delta Rule of learning and back propagation as understood in the general art of neural networks.

3. The computer implemented method according to claim 1 wherein said two-dimensional profile magnetic basement structural model is computer generated.

4. The computer implemented method according to claim 1 wherein said windowing is accomplished by:

lagging the profile with samples spaced symmetrically to make a window of values.

5. The computer implemented method according to claim 1 further comprising the step of:

creating a cumulative back propagation network of a plurality of processing elements in the input layer, a plurality of processing elements in at least one hidden layer, and at least one element in an output layer.

6. The computer implemented method according to claim 1 further comprising:

affixing a non-linear transfer function to the processing elements in order to achieve optimum learning through weight adjustment.

7. The computer implemented method according to claim 6 wherein said non-linear transfer function is a hyperbolic tangent.

8. The computer implemented method according to claim 1 further comprising:

affixing a linear transfer function to the processing elements in order to achieve optimum learning through weight adjustment.

9. The computer implemented method according to claim 1 further comprising:

allowing the network to learn for a plurality of iterations, then jogging the weighing and resume learning for at least twice the number of iterations.

10. The computer implemented method according to claim 1 further comprising:
   testing the network by calculating structural values from the input data.

11. The computer implemented method according to claim 1 used for basement depth determination.

12. The computer implemented method according to claim 1 used to locate basement structures.

13. The computer implemented method according to claim 1 used to locate basement faults.

14. The computer implemented method according to claim 1 used to determine vertical relief of basement structures.

15. The computer implemented method according to claim 1 used to determine separation of structural and compositional anomalies on aeromagnetic profiles.

16. The computer implemented method according to claim 1 used for aeromagnetic profile interpretation for basement mapping.

17. The computer implemented method according to claim 1 further comprising the step of:
   creating a cumulative back propagation network of at least one processing element in the input layer, at least one element in at least one hidden layer, and at least one element in an output layer;
   affixing a transfer function to the processing elements in order to achieve optimum learning; and
   allowing the network to learn for a plurality of iterations, then jogging the weighting and resuming learning for at least twice the number of iterations.

18. The computer implemented method according to claim 17 wherein a processing element can have many input paths coming into it an whose value is the sum of the incoming neuron values times their respective connection weights:

$$I_j \Sigma W_{ji} X_i$$

where $I_j$ is termed the Internal Activation of the $j^{th}$ processing element.

19. The computer implemented method according to claim 18 wherein the interval activation of this processing element is modified by a linear transfer function which then becomes input to the next layer of processing elements.

20. The computer implemented method according to claim 17 wherein the matrix of weights are determined or adjusted in response to an input and is referred to as the learning rule and, back-propogation, the responsibility for reducing output error is shared among all of the connection weights, said error first being calculated at the output layer by the difference between the desired output and the actual output, then multiplying this difference by the derivative of the transfer function:

$$E_k^{(out)} = F'(I_k^{(out)}) * (D_k - O_k)$$

and using a sum of products to the previous layer, the previous PE's are then assigned proportional error computed in a fashion similar to a feed forward sum of products:

$$E_j^{(s)} = F'(I_j^{(s)}) * \Sigma_k (E_k^{(s+1)} * W_{kj}^{(s+1)})$$

21. The computer implemented method according to claim 20 wherein the recursive process back-propagates the error throughout the network and finally the weights are adjusted with the following formula:

$$\Delta W_{ji} = lcoef * E_j^{(s)} * X_i^{(s-1)} E$$

where: lcoef = learning coefficient.

* * * * *